United States Patent
Kolla et al.

(10) Patent No.: US 10,635,159 B2
(45) Date of Patent: Apr. 28, 2020

(54) ADAPTIVE VOLTAGE MODULATION CIRCUITS FOR ADJUSTING SUPPLY VOLTAGE TO REDUCE SUPPLY VOLTAGE DROOPS AND MINIMIZE POWER CONSUMPTION

(71) Applicant: QUALCOMM Incorporated, San Diego, CA (US)

(72) Inventors: Yeshwant Nagaraj Kolla, Wake Forest, NC (US); Jeffrey Todd Bridges, Raleigh, NC (US); Sanjay Patel, Cary, NC (US); Shraddha Sridhar, Raleigh, NC (US); Burt Lee Price, Apex, NC (US); Gabriel Martel Tarr, Durham, NC (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 15/604,038

(22) Filed: May 24, 2017

(65) Prior Publication Data

US 2017/0344102 A1 Nov. 30, 2017

Related U.S. Application Data

(60) Provisional application No. 62/342,638, filed on May 27, 2016.

(51) Int. Cl.
*G06F 1/00* (2006.01)
*G06F 1/3296* (2019.01)
(Continued)

(52) U.S. Cl.
CPC ............ *G06F 1/3296* (2013.01); *G06F 1/324* (2013.01); *G06F 1/3287* (2013.01); *H02M 1/08* (2013.01);
(Continued)

(58) Field of Classification Search
CPC .................................................... G06F 1/3296
See application file for complete search history.

(56) References Cited

U.S. PATENT DOCUMENTS 8,933,737 B1  1/2015  Chatterjee et al.
9,395,782 B2  7/2016  Berry, Jr. et al.
(Continued)

OTHER PUBLICATIONS

International Preliminary Report on Patentability for PCT/US2017/034402, dated Jul. 16, 2018, 28 pages.
(Continued)

*Primary Examiner* — Mohammed H Rehman
(74) *Attorney, Agent, or Firm* — W&T/Qualcomm

(57) ABSTRACT

Adaptive voltage modulation circuits for adjusting supply voltage to reduce supply voltage droops and minimize power consumption are provided. In one aspect, an adaptive voltage modulation circuit detects a supply voltage droop by detecting when a supply voltage falls below a droop threshold voltage, and adjusts a clock signal provided to a load circuit in response to a supply voltage droop. The adaptive voltage modulation circuit keeps a count of the number of clock signal cycles during which the supply voltage is below the droop threshold voltage. The adaptive voltage modulation circuit increases the supply voltage in response to the count exceeding an upper threshold value, and decreases the supply voltage in response to the count being less than a lower threshold value at an end of a defined period. The adaptive voltage modulation circuit can reduce the time a load circuit operates with reduced frequency while minimizing power consumption.

30 Claims, 6 Drawing Sheets

(51) Int. Cl.
*H02M 3/157* (2006.01)
*G06F 1/324* (2019.01)
*G06F 1/3287* (2019.01)
*H02M 1/08* (2006.01)
*H02M 1/00* (2006.01)

(52) U.S. Cl.
CPC .... *H02M 3/157* (2013.01); *H02M 2001/0025* (2013.01)

(56) References Cited

U.S. PATENT DOCUMENTS

| | | | | |
|---|---|---|---|---|
| 9,413,344 | B2* | 8/2016 | Bowman | H03K 5/13 |
| 10,248,177 | B2* | 4/2019 | Rodriguez | G06F 1/26 |
| 2005/0062507 | A1 | 3/2005 | Naffziger et al. | |
| 2008/0030143 | A1* | 2/2008 | Goriki | H02M 7/48 |
| | | | | 315/209 R |
| 2011/0134155 | A1* | 6/2011 | Woo | G09G 3/3406 |
| | | | | 345/690 |
| 2011/0227890 | A1* | 9/2011 | Lee | H03K 4/02 |
| | | | | 345/211 |
| 2011/0291630 | A1 | 12/2011 | Konstadinidis et al. | |
| 2012/0187991 | A1 | 7/2012 | Sathe et al. | |
| 2014/0277812 | A1 | 9/2014 | Shih et al. | |
| 2016/0179163 | A1 | 6/2016 | Haider et al. | |
| 2016/0342185 | A1* | 11/2016 | Rodriguez | G06F 1/26 |

OTHER PUBLICATIONS

Second Written Opinion for PCT/US2017/034402, dated Apr. 16, 2018, 6 pages.
International Search Report and Written Opinion for PCT/US2017/034402, dated Jul. 7, 2017, 14 pages.

* cited by examiner

ADAPTIVE VOLTAGE MODULATION CIRCUITS FOR ADJUSTING SUPPLY VOLTAGE TO REDUCE SUPPLY VOLTAGE DROOPS AND MINIMIZE POWER CONSUMPTION

PRIORITY CLAIM

The present application claims priority to U.S. Provisional Patent Application Ser. No. 62/342,638 filed on May 27, 2016 and entitled "ADAPTIVE VOLTAGE MODULATION CIRCUITS FOR ADJUSTING SUPPLY VOLTAGE TO MITIGATE SUPPLY VOLTAGE DROOPS," the contents of which is incorporated herein by reference in its entirety.

BACKGROUND

I. Field of the Disclosure

The technology of the disclosure relates generally to supply voltage droops, and particularly to adjusting supply voltage to reduce supply voltage droops and power consumption.

II. Background

One factor that negatively affects circuit performance is the occurrence of supply voltage droops. A supply voltage droop is a temporary drop or reduction below a particular voltage level of a supply voltage provided by a power supply to one or more elements in a circuit, such as a transistor. Supply voltage droops may be the result of a surge in power supply current provided by the power supply in response to changes in load current demand of a circuit powered by the power supply. For example, the load current demand of a circuit can increase in response to transistors within the circuit switching during circuit operation. The increase in load current demand causes a surge in power supply current, which results in the supply voltage droop. The reduction in supply voltage corresponding to a supply voltage droop decreases the speed at which the circuit operates, thus negatively affecting circuit performance.

Various techniques can be used to reduce or avoid the effects of supply voltage droops in a circuit. For example, circuit elements can be designed to operate within a particular voltage margin relative to the supply voltage. In this manner, circuit elements can achieve desired operation when receiving a voltage that exceeds or falls short of the supply voltage by a particular percentage (i.e., margin), such as +/−10% of the supply voltage. However, such voltage margins are conventionally set to meet worst-case operating conditions, and thus, can increase power consumption and reduce circuit performance. As another example, voltage regulators can be used to sense changes in the load current demand of a circuit, and adjust the supply voltage in response to such changes. However, voltage regulators are typically too slow to effectively mitigate high frequency supply voltage droops. Additionally, voltage sensors can be used to detect a supply voltage droop and reduce a frequency of a clock signal in response to detecting a supply voltage droop so as to reduce the load current demand of a corresponding load circuit. However, reducing the frequency of the clock signal in this manner decreases the operating speed of the circuit. Thus, employing voltage sensors results in a circuit that experiences multiple supply voltage droops to frequently throttle to a lower clock frequency, which limits the performance of the circuit.

SUMMARY OF THE DISCLOSURE

Aspects disclosed in the detailed description include adaptive voltage modulation circuits for adjusting supply voltage to reduce supply voltage droops and minimize power consumption. In one aspect, an adaptive voltage modulation circuit is provided. The adaptive voltage modulation circuit detects if a supply voltage falls below a droop threshold voltage (i.e., detects a supply voltage droop), and adjusts a clock signal provided to a load circuit for the duration of the supply voltage droop. Adjusting the clock signal can include reducing a frequency at which the load circuit operates to reduce or avoid timing failures caused by the supply voltage droop. In addition to mitigating the effects of a supply voltage droop, the adaptive voltage modulation circuit counts the number of clock cycles during which the supply voltage is below the droop threshold voltage. In other words, the count indicates the length of time that the load circuit experiences supply voltage droop. The adaptive voltage modulation circuit increases the supply voltage in response to the count exceeding an upper threshold value. In this manner, the supply voltage is increased in response to the operation of the load circuit corresponding to higher load current demand Conversely, the adaptive voltage modulation circuit decreases the supply voltage in response to the count being less than a lower threshold value at an end of a defined period. In this manner, the supply voltage is decreased in response to the operation of the load circuit corresponding to lower load current demand. Adjusting the supply voltage based on the operational demands of the load circuit can reduce the occurrence of supply voltage droops and avoid setting the supply voltage higher than needed by the load circuit. Thus, the adaptive voltage modulation circuit mitigates the effects of supply voltage droops, and also reduces the occurrence of supply voltage droops while minimizing power consumption of the load circuit.

In this regard, in one aspect, an adaptive voltage modulation circuit is provided. The adaptive voltage modulation circuit comprises a supply voltage droop detection and mitigation circuit. The supply voltage droop detection and mitigation circuit comprises a detection circuit configured to generate a droop detection signal in an active state in response to a supply voltage provided to a load circuit being less than a droop threshold voltage. The supply voltage droop detection and mitigation circuit further comprises a clock adjustment circuit configured to adjust a load clock signal provided to the load circuit in response to the droop detection signal. The adaptive voltage modulation circuit further comprises a supply voltage adjust circuit. The supply voltage adjust circuit comprises a counter circuit configured to increment a count in response to each cycle of a reference clock signal in which the droop detection signal is in an active state. The supply voltage adjust circuit also comprises a voltage adjust-up circuit configured to generate a voltage adjust-up signal in an active state in response to the count being greater than an adjust-up threshold value. The supply voltage adjust circuit further comprises a voltage adjust-down circuit configured to generate a voltage adjust-down signal in an active state in response to the count being less than an adjust-down threshold value at an end of a defined period as measured by the reference clock signal. The adaptive voltage modulation circuit further comprises a supply voltage controller circuit. The supply voltage controller circuit is configured to increase the supply voltage provided to the load circuit in response to the voltage adjust-up signal being in an active state, and decrease the supply voltage provided to the load circuit in response to the voltage adjust-down signal being in an active state.

In another aspect, an adaptive voltage modulation circuit is provided. The adaptive voltage modulation circuit comprises a means for generating a droop detection signal in an active state in response to a supply voltage being less than a droop threshold voltage. The adaptive voltage modulation circuit also comprises a means for adjusting a load clock signal provided to a load circuit in response to the droop detection signal, and a means for incrementing a count in response to each cycle of a reference clock signal in which the droop detection signal is in an active state. The adaptive voltage modulation circuit also comprises a means for generating a voltage adjust-up signal in an active state in response to the count being greater than an adjust-up threshold value, and a means for generating a voltage adjust-down signal in an active state in response to the count being less than an adjust-down threshold value at an end of a defined period as measured by the reference clock signal. The adaptive voltage modulation circuit further comprises a means for increasing the supply voltage provided to the load circuit in response to the voltage adjust-up signal being in an active state, and a means for decreasing the supply voltage provided to the load circuit in response to the voltage adjust-down signal being in an active state.

In another aspect, a method for adaptively modulating a supply voltage is provided. The method comprises generating a droop detection signal in an active state in response to a supply voltage being less than a droop threshold voltage, and adjusting a load clock signal provided to a load circuit in response to the droop detection signal. The method further comprises incrementing a count in response to each cycle of a reference clock signal in which the droop detection signal is in an active state. The method also comprises generating a voltage adjust-up signal in an active state in response to the count being greater than an adjust-up threshold value, and generating a voltage adjust-down signal in an active state in response to the count being less than an adjust-down threshold value at an end of a defined period as measured by the reference clock signal. The method also comprises increasing the supply voltage provided to the load circuit in response to the voltage adjust-up signal being in an active state, and decreasing the supply voltage provided to the load circuit in response to the voltage adjust-down signal being in an active state.

In another aspect, a processor-based system is provided. The processor-based circuit comprises a processor, a power management circuit configured to provide a supply voltage to the processor, and an adaptive voltage modulation circuit. The adaptive voltage modulation circuit comprises a supply voltage droop detection and mitigation circuit. The supply voltage droop detection and mitigation circuit comprises a detection circuit configured to generate a droop detection signal in an active state in response to the supply voltage being less than a droop threshold voltage, and a clock adjustment circuit configured to adjust a load clock signal provided to the processor in response to the droop detection signal. The adaptive voltage modulation circuit also comprises a supply voltage adjust circuit. The supply voltage adjust circuit comprises a counter circuit configured to increment a count in response to each cycle of a reference clock signal in which the droop detection signal is in an active state. The supply voltage adjust circuit further comprises a voltage adjust-up circuit configured to generate a voltage adjust-up signal in an active state in response to the count being greater than an adjust-up threshold value, and a voltage adjust-down circuit configured to generate a voltage adjust-down signal in an active state in response to the count being less than an adjust-down threshold value at an end of a defined period as measured by the reference clock signal. The adaptive voltage modulation circuit further comprises a supply voltage controller circuit. The supply voltage controller is configured to increase the supply voltage provided to the processor in response to the voltage adjust-up signal being in an active state, and decrease the supply voltage provided to the processor in response to the voltage adjust-down signal being in an active state.

DETAILED DESCRIPTION

Figure 1:
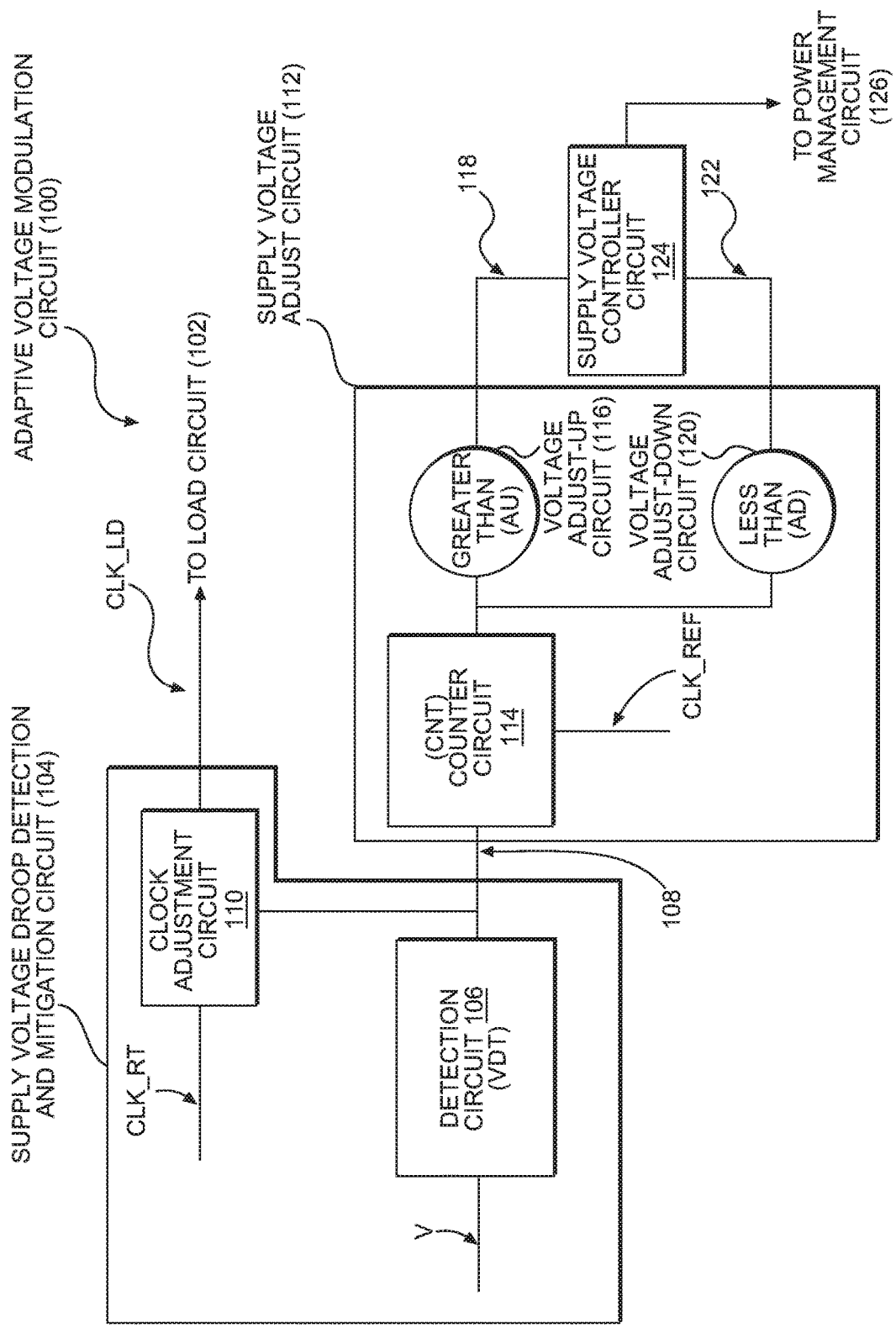
FIG. 1 is a block diagram of an exemplary adaptive voltage modulation circuit for reducing supply voltage droops and minimizing power consumption.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

FIG. 1 illustrates an exemplary adaptive voltage modulation circuit 100 that detects if a supply voltage (V) provided to a load circuit 102 falls below a droop threshold voltage (VDT) (i.e., detects a supply voltage droop). As used herein, a supply voltage droop is a temporary drop or reduction below a particular voltage level of the supply voltage (V) provided by a power supply to the load circuit 102. In response to detecting a supply voltage droop, the adaptive voltage modulation circuit 100 adjusts a load clock signal CLK_LD provided to the load circuit 102 for the duration of the supply voltage droop to mitigate the effects of the supply voltage droop. Additionally, the adaptive voltage modulation circuit 100 counts the length of time (e.g., the number of reference clock cycles) that the load circuit 102 experiences supply voltage droop, and increases the supply voltage (V) in response to the count exceeding an upper threshold value. Conversely, the adaptive voltage modulation circuit 100 decreases the supply voltage (V) in response to the count being less than a lower threshold value at an end of a defined period. As described in more detail below, adjusting the supply voltage (V) in this manner can reduce the occurrence of supply voltage droops and avoid setting the supply voltage (V) higher than needed by the load circuit 102. Thus, the adaptive voltage modulation circuit 100 mitigates the effects of supply voltage droops, and also reduces the occurrence of supply voltage droops while minimizing power consumption of the load circuit 102.

In this regard, with continuing reference to FIG. 1, the adaptive voltage modulation circuit 100 employs a supply voltage droop detection and mitigation circuit 104 that includes a detection circuit 106 configured to generate a droop detection signal 108 in an active state in response to the supply voltage (V) being less than the droop threshold voltage (VDT). As described in more detail below, the detection circuit 106 may be implemented as a comparator circuit using an operational amplifier configured to generate the droop detection signal 108 based on a comparison of the supply voltage (V) and the droop threshold voltage (VDT). Alternatively, the detection circuit 106 may be implemented using a critical path voltage monitoring (CPVM) circuit configured to generate the droop detection signal 108 in response to detecting that noise associated with the supply voltage (V) is great enough to reduce the supply voltage (V) below the droop threshold voltage (VDT). The supply voltage droop detection and mitigation circuit 104 also includes a clock adjustment circuit 110 configured to adjust the load clock signal CLK_LD provided to the load circuit 102 in response to the droop detection signal 108. For example, the clock adjustment circuit 110 can decrease a frequency of the load clock signal CLK_LD to be less than a frequency of a root clock signal CLK_RT received by the clock adjustment circuit 110 in response to the droop detection signal 108 transitioning to an active state (i.e., in response to detecting a supply voltage droop). As described in more detail below, the root clock signal CLK_RT can be a system level clock signal generated by a system circuit, such as a phase-locked loop (PLL).

With continuing reference to FIG. 1, decreasing the frequency of the load clock signal CLK_LD reduces a frequency at which the load circuit 102 operates, which may reduce or avoid timing failures caused by the supply voltage droop. As a non-limiting example, the clock adjustment circuit 110 in this aspect decreases the frequency of the load clock signal CLK_LD by dividing the root clock signal CLK_RT. In other aspects, the clock adjustment circuit 110 may adjust the root clock signal CLK_RT in other ways, such as, but not limited to, gating the root clock signal CLK_RT, or switching a clock mux to select a different frequency for the load clock signal CLK_LD. Additionally, the clock adjustment circuit 110 can also increase the frequency of the load clock signal CLK_LD in response to the droop detection signal 108 transitioning to an inactive state (i.e., in response to detecting the absence of a supply voltage droop) to be substantially equal to a frequency of the root clock signal CLK_RT.

With continuing reference to FIG. 1, the adaptive voltage modulation circuit 100 also employs a supply voltage adjust circuit 112 that includes a counter circuit 114 configured to count the number of cycles of a reference clock signal CLK_REF during which the supply voltage (V) is less than the droop threshold voltage (VDT). In particular, the counter circuit 114 is configured to increment a count CNT in response to each cycle of the reference clock signal CLK_REF in which the droop detection signal 108 is in the active state. As used herein, the reference clock signal CLK_REF may be a clock signal with a fixed frequency (e.g., twenty (20) megahertz (MHz)) that is separate and distinct from the root clock signal CLK_RT and the load clock signal CLK_LD. Alternatively, the reference clock signal CLK_REF may be the same as the root clock signal CLK_RT. Additionally, the counter circuit 114 can be configured to increment the count CNT for a defined period of time as measured by the reference clock signal CLK_REF, and reset the count CNT to an initial count value at the end of the defined period. In this manner, the count CNT indicates the percentage of the defined period that the load circuit 102 experiences supply voltage droop, and thus the percentage of time that the load circuit 102 operates with the reduced frequency of the load clock signal CLK_LD.

With continuing reference to FIG. 1, the supply voltage adjust circuit 112 also includes a voltage adjust-up circuit 116 configured to generate a voltage adjust-up signal 118 in an active state in response to the count CNT being greater than an adjust-up threshold value (AU). The voltage adjust-up circuit 116 may also be configured to generate the voltage adjust-up signal 118 in an inactive state in response to the count CNT being less than the adjust-up threshold value (AU) at the end of the defined period. Additionally, the supply voltage adjust circuit 112 includes a voltage adjust-down circuit 120 configured to generate a voltage adjust-down signal 122 in an active state in response to the count CNT being less than an adjust-down threshold value (AD) at the end of the defined period. The voltage adjust-down circuit 120 may also be configured to generate the voltage adjust-down signal 122 in an inactive state in response to the count CNT being greater than the adjust-down threshold value (AD) at the end of the defined period. In other words, the voltage adjust-up signal 118 is generated in an active state in response to the count CNT exceeding the adjust-up threshold value (AU) at any time during the defined period. Conversely, the voltage adjust-down signal 122 is generated in an active state in response to the count CNT being less than the adjust-down threshold value (AD) at the end of the defined period.

With continuing reference to FIG. 1, the voltage adjust-up signal 118 may also be generated in an inactive state in response to an acknowledgment signal from a supply voltage controller circuit 124 indicating that the supply voltage (V) has been adjusted up, wherein the acknowledgement signal also resets the count CNT. Additionally, the voltage adjust-down signal 122 may also be generated in an inactive state in response to an acknowledgment signal from the supply voltage controller circuit 124 indicating that the supply voltage (V) has been adjusted down, wherein the acknowledgement signal also resets the count CNT.

With continuing reference to FIG. 1, the adaptive voltage modulation circuit 100 also includes a supply voltage controller circuit 124 configured to increase the supply voltage (V) provided to the load circuit 102 in response to the voltage adjust-up signal 118. Additionally, the supply voltage controller circuit 124 is configured to decrease the supply voltage (V) provided to the load circuit 102 in response to the voltage adjust-down signal 122. In this example, the supply voltage controller circuit 124 adjusts the supply voltage (V) by instructing a power management circuit 126 to change the supply voltage (V) to a particular level. In this manner, the supply voltage (V) can be increased in response to the amount of time in which the frequency of the load clock signal CLK_LD is reduced within the defined period (also referred to as a "throttle percentage"). Thus, the adaptive voltage modulation circuit 100 increases the supply voltage (V) in response to the load circuit 102 experiencing supply voltage droops for a higher percentage of the defined period (e.g., a higher throttle percentage), and decreases the supply voltage (V) in response to the load circuit 102 experiencing supply voltage droops for a lower percentage of the defined period (e.g., a lower throttle percentage). In some aspects, the adaptive voltage modulation circuit 100 may increase or decrease the supply voltage (V) as described above by a pre-defined voltage step. As a non-limiting example, if the non-adjusted supply voltage (V) is equal to 800 millivolts (mV), then the adaptive voltage modulation circuit 100 may increase the supply voltage (V) by a pre-defined step of ten (10) mV or decrease the supply voltage (V) by a pre-defined step of 10 mV.

In this regard, the adaptive voltage modulation circuit 100 increases the supply voltage (V) in response to the operation of the load circuit 102 corresponding to a higher load current demand causing supply voltage droops to exceed the droop threshold voltage (VDT) with a relatively longer duration of time. Conversely, the adaptive voltage modulation circuit 100 decreases the supply voltage (V) in response to the operation of the load circuit 102 corresponding to a lower load current demand causing supply voltage droops to exceed the droop threshold voltage (VDT) with a relatively shorter duration of time. Adjusting the supply voltage (V) based on the operational demands and related supply voltage droop magnitude and duration of the load circuit 102 can reduce the occurrence of supply voltage droops and avoid setting the supply voltage (V) higher than needed by the load circuit 102. For example, the adaptive voltage modulation circuit 100 increases the supply voltage (V) in response to determining that the load circuit 102 has a higher load current demand, but decreases the supply voltage (V) in response to determining that the load circuit 102 has a lower load current demand. Thus, the adaptive voltage modulation circuit 100 can reduce the occurrence of supply voltage droops, which reduces the amount of time in which the load circuit 102 operates with a reduced frequency while also minimizing power consumption of the load circuit 102.

With continuing reference to FIG. 1, as a non-limiting example, the adaptive voltage modulation circuit 100 is employed with a defined period of 1000 cycles. Further, the initial count value of count CNT is set to zero (0), the adjust-up threshold value (AU) is set to thirty (30), and the adjust-down threshold value (AD) is set to ten (10). In response to the droop detection signal 108 being in an active state between cycle one (1) and cycle ten (10) of the defined period, the counter circuit 114 increments the count CNT to ten (10), and the clock adjustment circuit 110 reduces the frequency of the load clock signal CLK_LD. Between cycle eleven (11) and cycle thirty (30) of the defined period, the droop detection signal 108 is in an inactive state, signifying that there is no supply voltage droop. However, between cycle thirty-one (31) and cycle fifty-two (52) of the defined period, the droop detection signal 108 is in an active state, which causes the counter circuit 114 to increment the count CNT to thirty-one (31). In response to the count CNT being greater than the adjust-up threshold value (AU) of thirty (30), the voltage adjust-up circuit 116 generates the voltage adjust-up signal 118 in an active state, thus causing the supply voltage controller circuit 124 to increase the supply voltage (V) provided to the load circuit 102 to reduce the occurrence of supply voltage droops.

With continuing reference to FIG. 1, as an alternative non-limiting example, the droop detection signal 108 is in an active state only between cycle twenty (20) and cycle twenty-five (25) of the defined period. In this manner, the count CNT is only incremented to a value of five (5) during the 1000 cycles of the defined period. At the end of the defined period, the voltage adjust-down circuit 120 generates the voltage adjust-down signal 122 in an active state in response to the count CNT being less than the adjust-down threshold value (AD) of ten (10). As a result, the supply voltage controller circuit 124 decreases the supply voltage (V), thus minimizing the power consumption of the load circuit 102.

Figure 2:
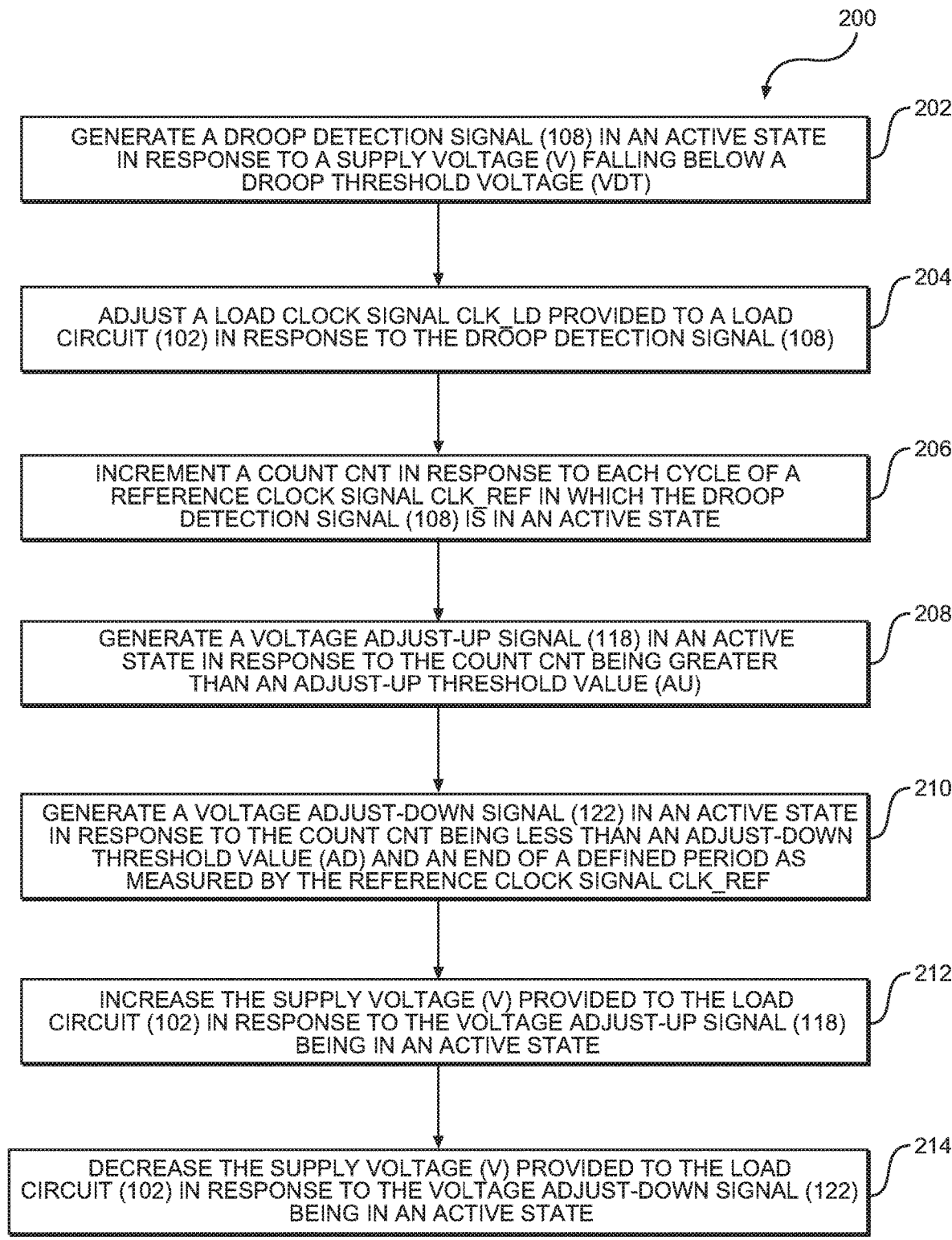
FIG. 2 is a flowchart illustrating an exemplary process that can be employed by the adaptive voltage modulation circuit in FIG. 1 to adaptively modulate supply voltage to reduce supply voltage droops and minimize power consumption.

FIG. 2 illustrates an exemplary process 200 that can be employed by the adaptive voltage modulation circuit 100 in FIG. 1 to adaptively modulate supply voltage (V) to reduce supply voltage droops and minimize power consumption. The process 200 includes the detection circuit 106 generating the droop detection signal 108 in an active state in response to the supply voltage (V) being less than the droop threshold voltage (VDT) (block 202). The process 200 also includes the clock adjustment circuit 110 adjusting the load clock signal CLK_LD provided to the load circuit 102 in response to the droop detection signal 108 (block 204). Additionally, the process 200 includes the counter circuit 114 incrementing the count CNT in response to each cycle of the reference clock signal CLK_REF in which the droop detection signal 108 is in an active state (block 206). The process 200 also includes the voltage adjust-up circuit 116 generating the voltage adjust-up signal 118 in an active state in response to the count CNT being greater than the adjust-up threshold value (AU) (block 208). Further, the process 200 includes the voltage adjust-down circuit 120 generating the voltage adjust-down signal 122 in an active state in response to the count CNT being less than the adjust-down threshold value (AD) and the end of the defined period as measured by the reference clock signal CLK_REF (block 210). The process 200 also includes the supply voltage controller circuit 124 increasing the supply voltage (V) provided to the load circuit 102 in response to the voltage adjust-up signal 118 being in an active state (block 212). The process 200 also includes the supply voltage controller circuit 124 decreasing the supply voltage (V) provided to the load circuit 102 in response to the voltage adjust-down signal 122 being in an active state (block 214). Adjusting the supply voltage (V) using the process 200 to meet the operational demands of the load circuit 102 reduces the amount of time in which the load circuit 102 operates with a reduced frequency while minimizing power consumption of the load circuit 102.

Figure 3:
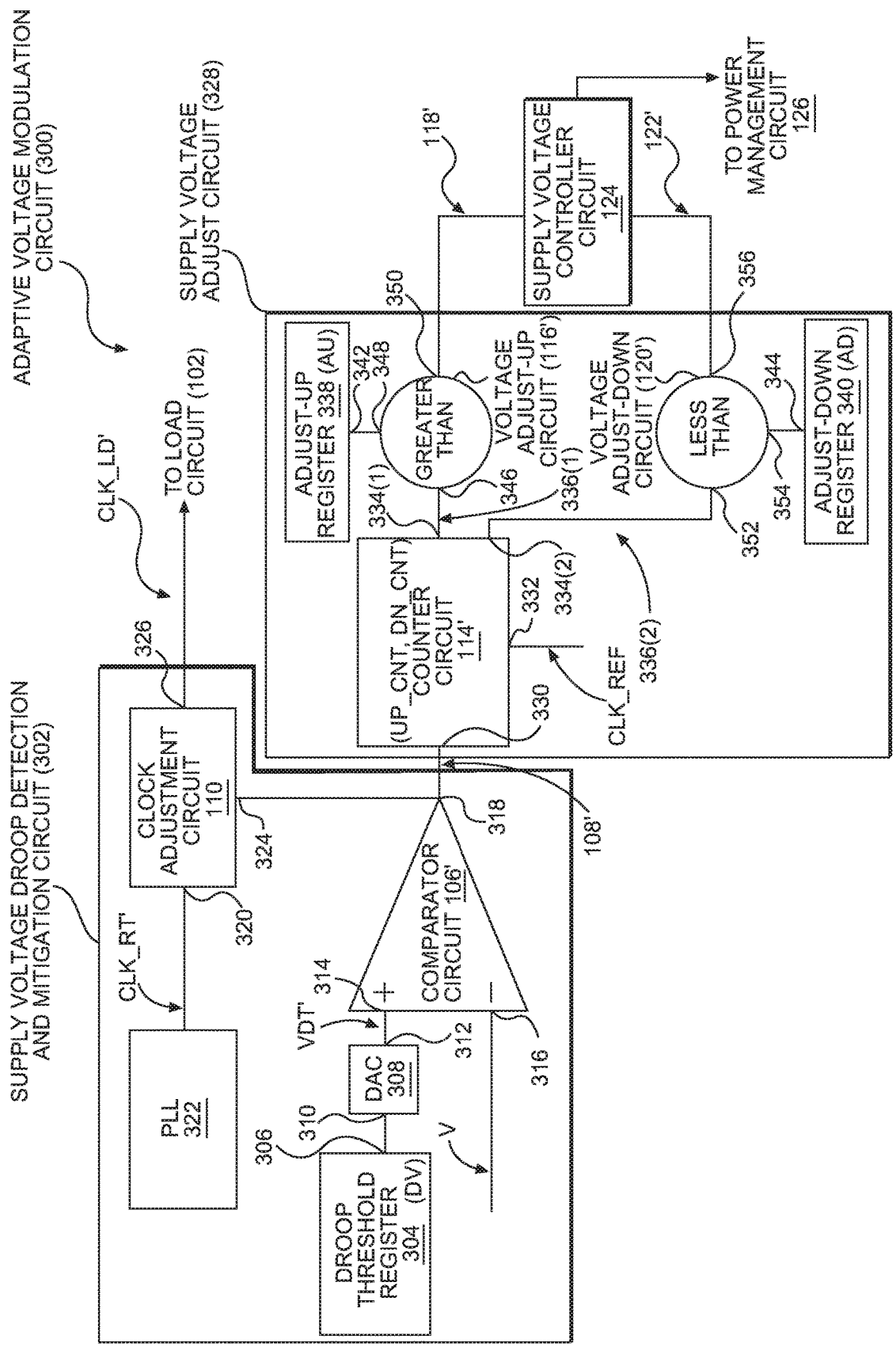
FIG. 3 is a block diagram of another exemplary adaptive voltage modulation circuit for reducing supply voltage droops and minimizing power consumption.

FIG. 3 illustrates another exemplary adaptive voltage modulation circuit 300 for reducing supply voltage droops and minimizing power consumption. The adaptive voltage modulation circuit 300 includes certain common components with the adaptive voltage modulation circuit 100 of FIG. 1 as shown by common element numbers between FIGS. 1 and 3, and thus will not be re-described herein.

With reference to FIG. 3, the adaptive voltage modulation circuit 300 employs a supply voltage droop detection and mitigation circuit 302 that includes a detection circuit implemented as a comparator circuit 106'. In particular, the comparator circuit 106' is configured to generate a droop detection signal 108' based on performing a comparison of a supply voltage (V) and a droop threshold voltage (VDT'). The droop threshold voltage (VDT') in this aspect is determined based on a digital threshold value (DV) that is stored in a droop threshold register 304 included in the supply voltage droop detection and mitigation circuit 302. The digital threshold value (DV) is a digital representation of the droop threshold voltage (VDT'), wherein the droop threshold register 304 is configured to provide the digital threshold value (DV) on an output node 306 of the droop threshold register 304. Additionally, the supply voltage droop detection and mitigation circuit 302 includes a digital-to-analog converter (DAC) 308 to convert the digital threshold value (DV) into the droop threshold voltage (VDT') used by the comparator circuit 106'. In particular, the DAC 308 includes an input node 310 electrically coupled to the output node 306 of the droop threshold register 304, and an output node 312 on which the DAC 308 is configured to provide the droop threshold voltage (VDT').

With continuing reference to FIG. 3, the comparator circuit 106' includes a first input node 314 electrically coupled to the output node 312 of the DAC 308 so as to receive the droop threshold voltage (VDT'), as well as a second input node 316 that receives the supply voltage (V). The comparator circuit 106' also includes an output node 318 on which the comparator circuit 106' is configured to provide the droop detection signal 108'. More specifically, the droop detection signal 108' generated by the comparator circuit 106' transitions to an active state in response to the droop threshold voltage (VDT') being greater than the supply voltage (V). In other words, the droop detection signal 108' is in an active state in response to detecting a supply voltage droop. Additionally, the droop detection signal 108' generated by the comparator circuit 106' transitions to an inactive state in response to the droop threshold voltage (VDT') being less than the supply voltage (V). In other words, the droop detection signal 108' is in an inactive state in response to detecting that there is currently no supply voltage droop.

With continuing reference to FIG. 3, the supply voltage droop detection and mitigation circuit 302 also includes a clock adjustment circuit 110 configured to adjust a load clock signal CLK_LD' provided to a load circuit 102 in response to the droop detection signal 108'. In particular, the clock adjustment circuit 110 includes a first input node 320 that receives a root clock signal CLK_RT' that is generated by a phase-locked loop (PLL) 322 in this aspect. The clock adjustment circuit 110 also includes a second input node 324 that is electrically coupled to the output node 318 of the comparator circuit 106' such that the second input node 324 receives the droop detection signal 108'. Further, the clock adjustment circuit 110 includes an output node 326 on which the clock adjustment circuit 110 is configured to provide the load clock signal CLK_LD'. As previously described above, adjusting the load clock signal CLK_LD' in response to detecting a supply voltage droop can reduce or avoid timing failures caused by the supply voltage droop while other portions of the adaptive voltage modulation circuit 300 adjust the supply voltage (V) to reduce the occurrence of supply voltage droops.

With continuing reference to FIG. 3, the adaptive voltage modulation circuit 300 also employs a supply voltage adjust circuit 328 that includes a counter circuit 114' configured to count the number of cycles of the reference clock signal CLK_REF during which the supply voltage (V) is less than the droop threshold voltage (VDT'). In this aspect, the counter circuit 114' is employed as a sixteen (16)-bit counter circuit 114'. The counter circuit 114' includes a first input node 330 on which the counter circuit 114' is configured to receive the droop detection signal 108'. The counter circuit 114' also includes a second input node 332 on which the counter circuit 114' is configured to receive the reference clock signal CLK_REF. Rather than keeping a single count CNT as described with reference to FIG. 1, the counter circuit 114' is configured to keep two separate counts, an adjust-up count UP_CNT and an adjust-down count DN_CNT, each of which corresponds to a specific defined period. More specifically, the counter circuit 114' increments the adjust-up count UP_CNT in response to each cycle of the reference clock signal CLK_REF in which the droop detection signal 108' is in the active state during an adjust-up period, and resets the count CNT to the initial count value at the end of the adjust-up period. Additionally, the counter circuit 114' increments the adjust-down count DN_CNT in response to each cycle of the reference clock signal CLK_REF in which the droop detection signal 108' is in the active state during an adjust-down period, and resets the count CNT to the initial count value at the end of the adjust-down period.

With continuing reference to FIG. 3, employing separate adjust-up and adjust-down counts UP_CNT, DN_CNT corresponding to separate adjust-up and adjust-down periods allows this aspect to assign a higher weight to either higher performance or greater power savings. For example, to place a higher weight on higher performance, the adjust-up period can be defined to be shorter in duration than the adjust-down period such that the decision to increase the supply voltage (V) is evaluated more often than the decision to decrease the supply voltage (V). Conversely, to place a higher weight on greater power savings, the adjust-down period can be defined to be shorter in duration than the adjust-up period such that the decision to decrease the supply voltage (V) is evaluated more often than the decision to increase the supply voltage (V). To communicate the adjust-up and adjust-down counts UP_CNT, DN_CNT, the counter circuit 114' includes a first output node 334(1) on which the counter circuit 114' is configured to provide an up count signal 336(1) indicating the adjust-up count UP_CNT, and a second output node 334(2) on which the counter circuit 114' is configured to provide a down count signal 336(2) indicating the adjust-down count DN_CNT.

With continuing reference to FIG. 3, in order to adjust the supply voltage (V) based on the adjust-up and adjust-down counts UP_CNT, DN_CNT, the supply voltage adjust circuit 328 also includes an adjust-up register 338 and an adjust-down register 340. In particular, the adjust-up register 338 is configured to store an adjust-up threshold value (AU), while the adjust-down register 340 is configured to store an adjust-down threshold value (AD). The adjust-up register 338 includes an output node 342 on which the adjust-up register 338 is configured to provide the adjust-up threshold value (AU). Similarly, the adjust-down register 340 includes an output node 344 on which the adjust-down register 340 is configured to provide the adjust-down threshold value (AD). As a non-limiting example, the adjust-up and adjust-down threshold values (AU), (AD) can be determined during testing of a corresponding chip and stored in the adjust-up and adjust-down registers 338, 340.

With continuing reference to FIG. 3, the supply voltage adjust circuit 328 also includes a voltage adjust-up circuit 116' configured to generate a voltage adjust-up signal 118' in response to the adjust-up count UP_CNT being greater than the adjust-up threshold value (AU). In particular, the voltage adjust-up circuit 116' includes a first input node 346 electrically coupled to the first output node 334(1) of the counter circuit 114' so as to receive the up count signal 336(1). The voltage adjust-up circuit 116' also includes a second input node 348 electrically coupled to the output node 342 of the adjust-up register 338 so as to receive the adjust-up threshold value (AU). The voltage adjust-up circuit 116' further includes an output node 350 on which the voltage adjust-up circuit 116' is configured to provide the voltage adjust-up signal 118'. In particular, the voltage adjust-up signal 118' is initially in an inactive state, wherein the voltage adjust-up circuit 116' generates the voltage adjust-up signal 118' in an active state in response to the adjust-up count UP_CNT indicated by the up count signal 336(1) being greater than the adjust-up threshold value (AU) at any time during the defined period. Additionally, the voltage adjust-up circuit 116' resets the voltage adjust-up signal 118' to an inactive state in response to the adjust-up count UP_CNT indicated by the up count signal 336(1) being less than the adjust-up threshold value (AU) at the end of the adjust-up period. In this manner, the voltage adjust-up signal 118' is in active state if the load circuit 102 experiences supply voltage droop for a larger percentage of the adjust-up period, indicating that the supply voltage (V) should be increased to reduce or avoid supply voltage droops. Further, the voltage adjust-up signal 118' may be generated in an inactive state in response to an acknowledgment signal from the supply voltage controller circuit 124 indicating that the supply voltage (V) has been adjusted down, wherein the acknowledgement signal also resets the adjust-up count UP_CNT.

With continuing reference to FIG. 3, the supply voltage adjust circuit 328 also includes a voltage adjust-down circuit 120' configured to generate a voltage adjust-down signal 122' in response to the adjust-down count DN_CNT being less than the adjust-down threshold value (AD) at the end of the adjust-down period. In particular, the voltage adjust-down circuit 120' includes a first input node 352 electrically coupled to the second output node 334(2) of the counter circuit 114' so as to receive the down count signal 336(2). The voltage adjust-down circuit 120' also includes a second input node 354 electrically coupled to the output node 344 of the adjust-down register 340 so as to receive the adjust-down threshold value (AD). The voltage adjust-down circuit 120' further includes an output node 356 on which the voltage adjust-down circuit 120' is configured to provide the voltage adjust-down signal 122'. In particular, the voltage adjust-down signal 122' is initially in an inactive state, wherein the voltage adjust-down circuit 120' generates the voltage adjust-down signal 122' in an active state in response to the adjust-down count DN_CNT indicated by the down count signal 336(2) being less than the adjust-down threshold value (AD) at the end of the adjust-down period. Additionally, the voltage adjust-down circuit 120' generates the voltage adjust-down signal 122' in an inactive state in response to the adjust-down count DN_CNT indicated by the down count signal 336(2) being greater than the adjust-down threshold value (AD) at the end of the adjust-down period. In this manner, the voltage adjust-down signal 122' is in an active state if the load circuit 102 does not experience supply voltage droop for a particular percentage of the adjust-down period, indicating that the supply voltage (V) can be reduced to minimize power consumption of the load circuit 102. Further, the voltage adjust-down signal 122' may be generated in an inactive state in response to an acknowledgment signal from the supply voltage controller circuit 124 indicating that the supply voltage (V) has been adjusted up, wherein the acknowledgement signal also resets the adjust down count DN_CNT.

With continuing reference to FIG. 3, the adaptive voltage modulation circuit 300 also includes a supply voltage controller circuit 124 configured to adjust the supply voltage (V) by instructing a power management circuit 126 to change the supply voltage (V) to a particular level. As previously described, the supply voltage controller circuit 124 is configured to increase the supply voltage (V) provided to the load circuit 102 in response to the voltage adjust-up signal 118' being in an active state. Additionally, the supply voltage controller circuit 124 is configured to decrease the supply voltage (V) provided to the load circuit 102 in response to the voltage adjust-down signal 122' being in an active state.

As a non-limiting example, in some aspects the supply voltage controller circuit 124 can include a finite state machine to determine whether to increase or decrease the supply voltage (V). Such aspects may also include multiple instances of the supply voltage adjust circuit 328, each of which corresponds to a different instance of the load circuit 102, communicating with the supply voltage controller circuit 124. Further, other aspects of the supply voltage controller circuit 124 may include a controller circuit configured to run firmware to perform the functions described above. In this manner, the supply voltage controller circuit 124 can arbitrate between demands of each supply voltage adjust circuit 328 and adjust the supply voltage (V) according to the needs of a chip employing the multiple instances of the load circuit 102.

Figure 4:
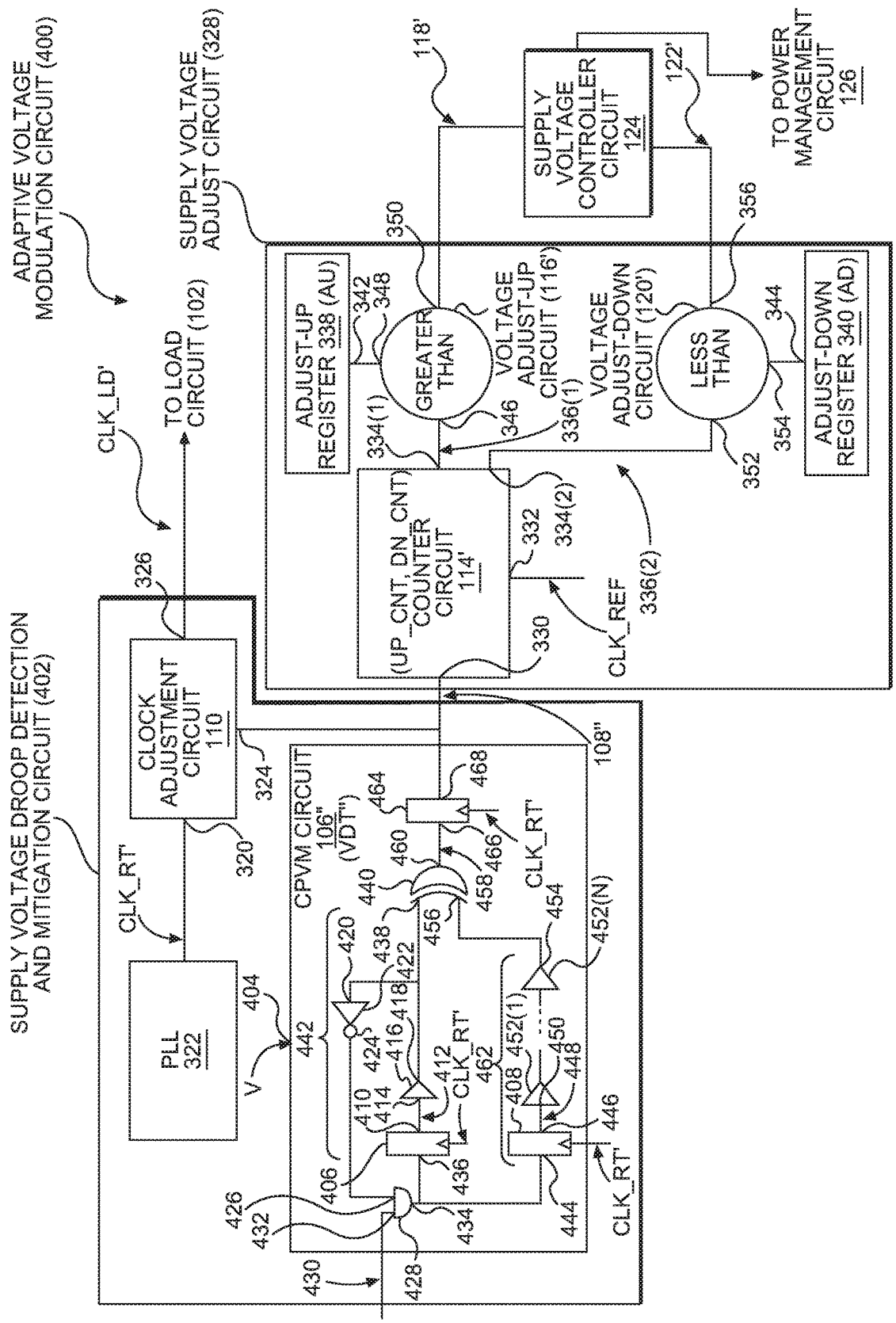
FIG. 4 is a block diagram of another exemplary adaptive voltage modulation circuit for reducing supply voltage droops and minimizing power consumption.

FIG. 4 illustrates another exemplary adaptive voltage modulation circuit 400 for reducing supply voltage droops and minimizing power consumption. The adaptive voltage modulation circuit 400 includes certain common components with the adaptive voltage modulation circuits 100 and 300 of FIGS. 1 and 3, which are shown by common element numbers among FIGS. 1, 3, and 4, and thus will not be re-described herein.

With reference to FIG. 4, the adaptive voltage modulation circuit 400 employs a supply voltage droop detection and mitigation circuit 402 that includes a detection circuit implemented as a critical path voltage monitoring (CPVM) circuit 106". The CPVM circuit 106" is configured to generate a droop detection signal 108" in response to detecting that noise associated with the supply voltage (V) is great enough to reduce a supply voltage (V) below a droop threshold voltage (VDT"). As a non-limiting example, the CPVM circuit 106" is powered by the supply voltage (V) on a power input 404, and includes flip flop circuits 406, 408. The flip flop circuit 406 is clocked by the root clock signal CLK_RT', and includes an output node 410 on which the flip flop circuit 406 is configured to provide an output signal 412. The output node 410 is electrically coupled to an input node 414 of a buffer 416. The buffer 416 has an output node 418 electrically coupled to an input node 420 of an inverter 422, wherein an output node 424 of the inverter 422 is electrically coupled to an input node 426 of an AND-based gate 428 (e.g., AND gate 428). Additionally, an enable signal 430 is provided to a second input node 432 of the AND gate 428, and an output node 434 of the AND gate 428 is electrically coupled to an input node 436 of the flip flop circuit 406. In this manner, the flip flop circuit 406 functions as a toggle flip flop circuit in response to the enable signal 430. More specifically, the output signal 412 toggles between a logic '1' value and a logic '0' value at a frequency approximately equal to one-half (½) of a frequency of the root clock signal CLK_RT'. Additionally, the output node 418 of the buffer 416 is electrically coupled to a first input node 438 of an XOR-based gate 440 (e.g., XOR gate 440). Employing the flip flop circuit 406 and the buffer 416 in this manner results in a corresponding first path 442. In particular, the first path 442 serves as a controlled reference path designed to provide a stable value to the first input node 438 of the XOR gate 440 even during a maximum amount of supply voltage droop.

With continuing reference to FIG. 4, the flip flop circuit 408 is also clocked by the root clock signal CLK_RT', and includes an input node 444 electrically coupled to the output node 434 of the AND gate 428, and an output node 446 on which the flip flop circuit 408 is configured to provide an output signal 448. In this manner, the flip flop circuit 408 is configured to function as a toggle flip flop circuit, wherein the output signal 448 toggles between a logic '1' value and a logic '0' value at a frequency approximately equal to one-half (½) of the frequency of the root clock signal CLK_RT'. The output node 446 is electrically coupled to an input node 450 of a buffer 452(1) that is a first buffer 452(1) of a plurality of serially connected buffers 452(1)-452(N). In this example, the number N of buffers 452(1)-452(N) is set to represent a delay value correlating to the droop threshold voltage (VDT"). Further, an output node 454 of the buffer 452(N) (e.g., the last buffer 452(N)) is electrically coupled to a second input node 456 of the XOR gate 440.

With continuing reference to FIG. 4, an output signal 458 of the XOR gate 440 representative of whether a supply voltage droop occurs is provided on an output node 460 of the XOR gate 440. As a non-limiting example, in an exemplary cycle of the root clock signal CLK_RT', the flip flop circuit 406 receives a logic '1' value, resulting in the first path 442 providing a logic '1' value to the first input node 438 of the XOR gate 440. Additionally, the flip flop circuit 408 receives a logic '1' value. In this regard, a second path 462 corresponding to the flip flop circuit 408 and buffers 452(1)-452(N) may provide a logic '1' value to the second input node 456 following a delay corresponding to the buffers 452(1)-452(N) if the supply voltage (V) has a high enough value. In response to the first and second input nodes 438, 456 both receiving a logic '1' value, the output signal 458 has a logic '0' value, representing that no supply voltage droop is present. However, the second path 462 is designed to have a delay corresponding to the buffers 452(1)-452(N) such that a logic '0' value is generated in this example if the supply voltage (V) droops below the droop threshold voltage (VDT"). As a result, a logic '0' value is temporarily provided to the second input node 456 based on a clock period of the root clock signal CLK_RT'. Thus, in response to the second input node 456 receiving a logic '0' value while the first input node 438 receives a logic '1' value, the output signal 458 has a logic '1' value, representing that a supply voltage droop is present. As an additional non-limiting example, on a following cycle of the root clock signal CLK_RT', the flip flop circuit 406 receives a logic '0' value such that the first path 442 provides a logic '0' value to the first input node 438 of the XOR gate 440. The flip flop circuit 408 also receives a logic '0' value, wherein the second path 462 provides a logic '0' value to the second input node 456 if the supply voltage (V) does not droop below the droop threshold voltage (VDT"), resulting in the output signal 458 having a logic '0' value which represents that no supply voltage droop is present. However, the second path 462 provides a logic '1' value to the second input node 456 if the supply voltage (V) droops below the droop threshold voltage (VDT"), resulting in the output signal 458 having a logic '1' value which represents that a supply voltage droop is present.

With continuing reference to FIG. 4, the CPVM circuit 106" also includes the flip flop circuit 464 that includes an input node 466 configured to receive the output signal 458, and is clocked by the root clock signal CLK_RT'. Additionally, the flip flop circuit 464 includes an output node 468 on which the flip flop circuit 464 is configured to generate a droop detection signal 108" based on the output signal 458. In particular, the delay corresponding to the second path 462, plus the delay corresponding to the XOR gate 440 is designed to miss a setup time of the flip flop circuit 464 when the supply voltage (V) droops below the droop threshold voltage (VDT"), which causes the droop detection signal 108" to indicate a supply voltage droop. The droop detection signal 108" is used by the clock adjustment circuit 110 and the supply voltage adjust circuit 328 as previously described. In this manner, the CPVM circuit 106" can be employed to detect a supply voltage droop based on the timing-based determination described above rather than the voltage comparison determination described in FIG. 3.

The elements described herein are sometimes referred to as means for performing particular functions. In this regard, the detection circuit 106 illustrated in FIG. 1 is an example of "a means for generating a droop detection signal in an active state in response to a supply voltage being less than a droop threshold voltage." The detection circuit 106 illustrated in FIG. 1 is also an example of "a means for performing a comparison of the supply voltage to the droop threshold voltage" and "a means for generating the droop detection signal in an inactive state in response to the droop threshold voltage being less than the supply voltage." The clock adjustment circuit 110 illustrated in FIG. 1 is an example of "a means for adjusting a load clock signal provided to a load circuit in response to the droop detection signal." The clock adjustment circuit 110 illustrated in FIG. 1 is also an example of "a means for decreasing a frequency of the load clock signal in response to the droop detection signal transitioning to an active state such that the frequency of the load clock signal is lower than a frequency of the root clock signal." The clock adjustment circuit 110 illustrated in FIG. 1 is also an example of "a means for increasing the frequency of the load clock signal in response to the droop detection signal transitioning to an inactive state such that the frequency of the load clock signal is equal or substantially equal to the frequency of the root clock signal." The counter circuit 114 illustrated in FIG. 1 is an example of "a means for incrementing a count in response to each cycle of a reference clock signal in which the droop detection signal is in an active state." The counter circuit 114 illustrated in FIG. 1 is also an example of "a means for resetting the count to an initial count value in response to the end of the defined period."

Additionally, the voltage adjust-up circuit 116 illustrated in FIG. 1 is an example of "a means for generating a voltage adjust-up signal in an active state in response to the count being greater than an adjust-up threshold value." The voltage adjust-up circuit 116 illustrated in FIG. 1 is also an example of "a means for generating the voltage adjust-up signal in an inactive state in response to the count being less than the adjust-up threshold value." The voltage adjust-down circuit 120 illustrated in FIG. 1 is an example of "a means for generating a voltage adjust-down signal in an active state in response to the count being less than an adjust-down threshold value at an end of a defined period as measured by the reference clock signal." The voltage adjust-down circuit 120 illustrated in FIG. 1 is also an example of "a means for generating a voltage adjust-down signal in an inactive state in response to the count being greater than the adjust-down threshold value." The supply voltage controller circuit 124 illustrated in FIG. 1 is an example of "a means for increasing the supply voltage provided to the load circuit in response to the voltage adjust-up signal being in an active state." The supply voltage controller circuit 124 illustrated in FIG. 1 is also an example of "a means for decreasing the supply voltage provided to the load circuit in response to the voltage adjust-down signal being in an active state." The DAC 308 illustrated in FIG. 3 is an example of "a means for generating the droop threshold voltage based on a digital threshold signal, wherein the digital threshold signal is a digital representation of the droop threshold voltage stored in a register in the adaptive voltage modulation circuit."

The adaptive voltage modulation circuits for adjusting supply voltage to reduce supply voltage droops and minimize power consumption according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5:
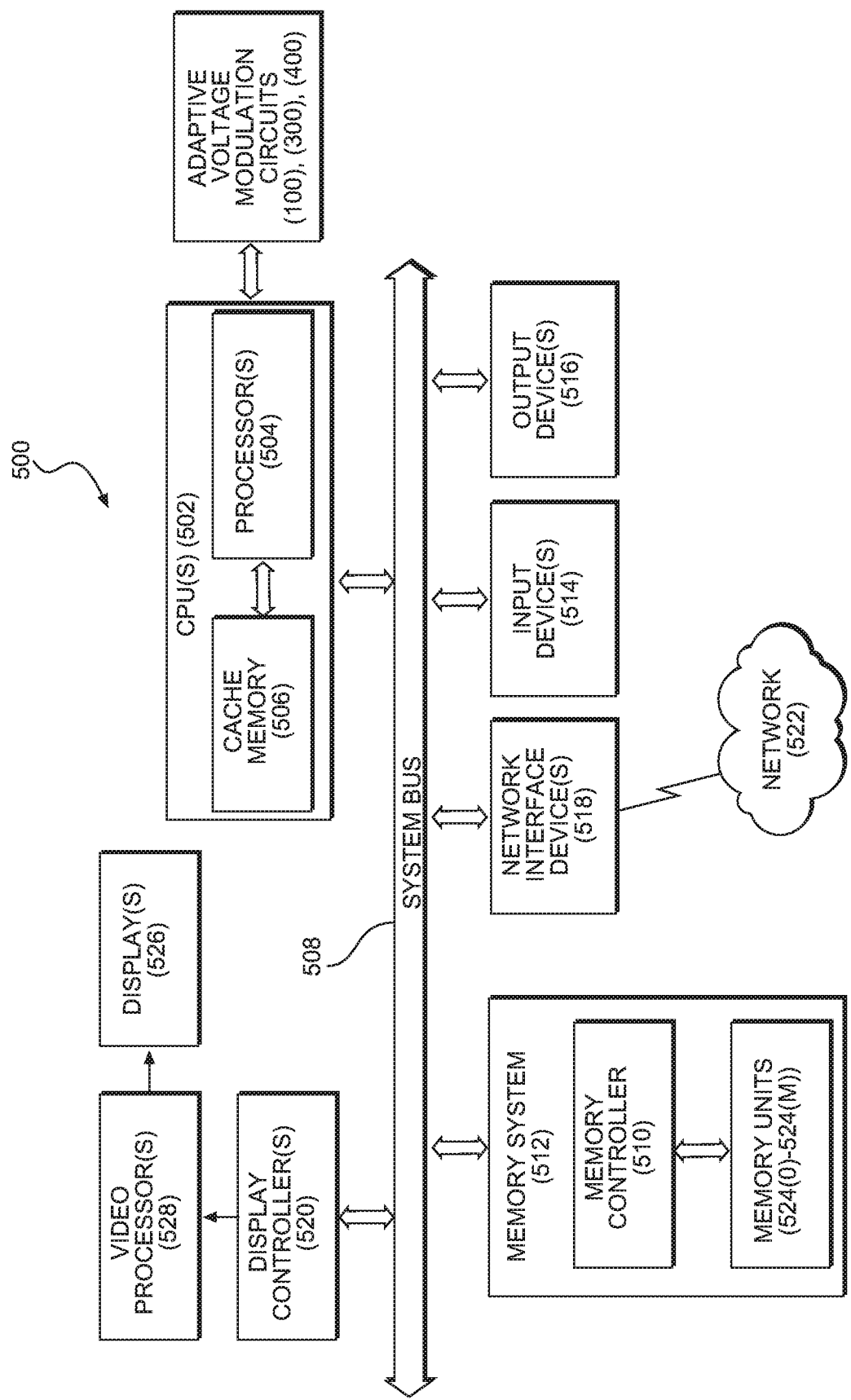
FIG. 5 is a block diagram of an exemplary processor-based system that can include the adaptive voltage modulation circuits for reducing supply voltage droops in FIGS. 1, 3, and 4.

In this regard, FIG. 5 illustrates an example of a processor-based system 500 that can employ the adaptive voltage modulation circuits 100, 300, and 400 illustrated in FIGS. 1, 3, and 4, respectively. In this example, the processor-based system 500 includes one or more central processing units (CPUs) 502, each including one or more processors 504. The CPU(s) 502 may have cache memory 506 coupled to the processor(s) 504 for rapid access to temporarily stored data. The CPU(s) 502 is coupled to a system bus 508 and can intercouple master and slave devices included in the processor-based system 500. As is well known, the CPU(s) 502 communicates with these other devices by exchanging address, control, and data information over the system bus 508. For example, the CPU(s) 502 can communicate bus transaction requests to a memory controller 510 as an example of a slave device. Although not illustrated in FIG. 5, multiple system buses 508 could be provided, wherein each system bus 508 constitutes a different fabric.

Other master and slave devices can be connected to the system bus 508. As illustrated in FIG. 5, these devices can include a memory system 512, one or more input devices 514, one or more output devices 516, one or more network interface devices 518, and one or more display controllers 520, as examples. The input device(s) 514 can include any type of input device, including, but not limited to, input keys, switches, voice processors, etc. The output device(s) 516 can include any type of output device, including, but not limited to, audio, video, other visual indicators, etc. The network interface device(s) 518 can be any device configured to allow exchange of data to and from a network 522. The network 522 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 518 can be configured to support any type of communications protocol desired. The memory system 512 can include one or more memory units 524(0)-524(M).

The CPU(s) 502 may also be configured to access the display controller(s) 520 over the system bus 508 to control information sent to one or more displays 526. The display controller(s) 520 sends information to the display(s) 526 to be displayed via one or more video processors 528, which process the information to be displayed into a format suitable for the display(s) 526. The display(s) 526 can include any type of display, including, but not limited to, a cathode ray tube (CRT), a liquid crystal display (LCD), a plasma display, a light emitting diode (LED) display, etc.

Figure 6:
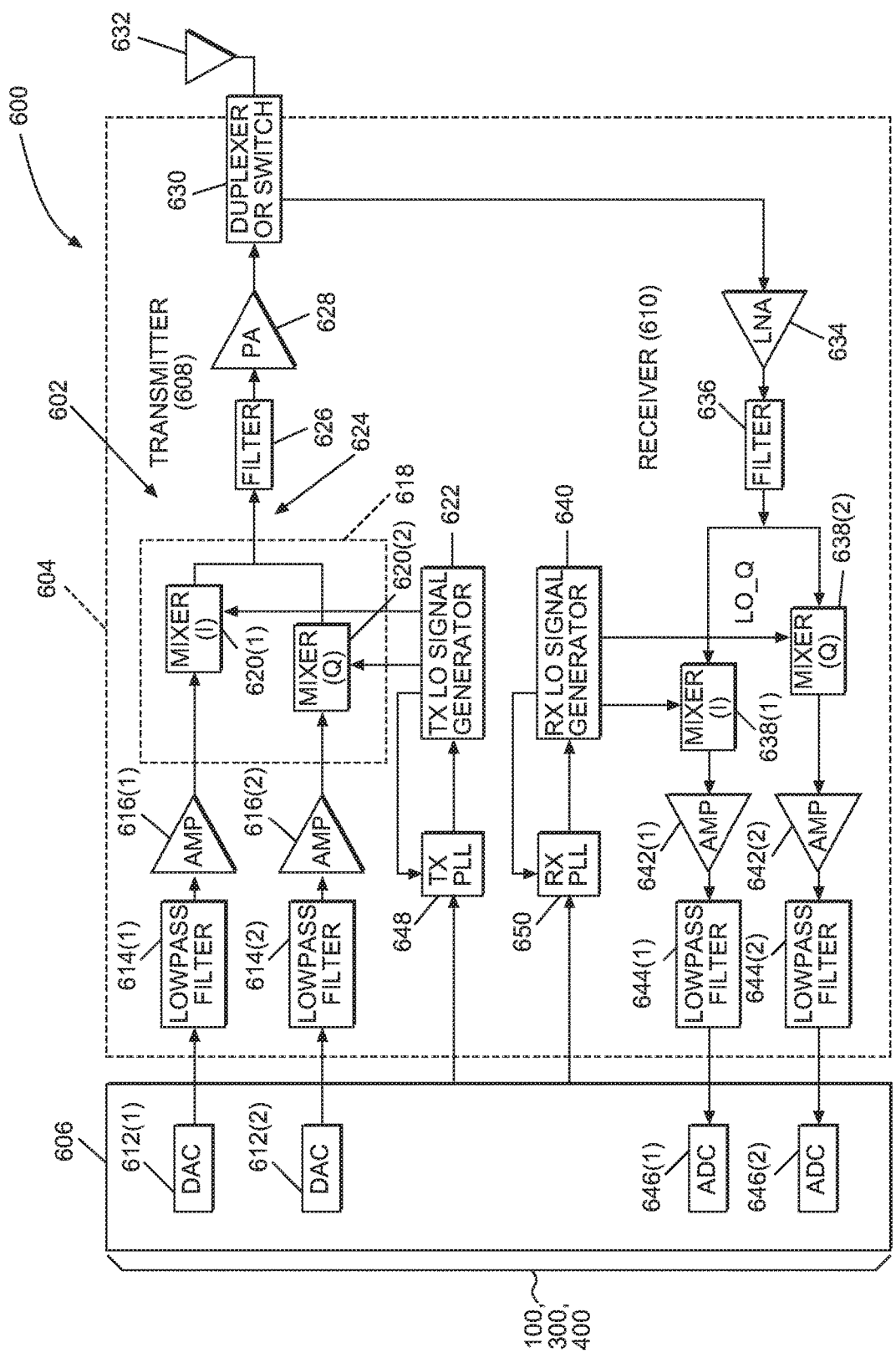
FIG. 6 is a block diagram of an exemplary wireless communications device that includes radio-frequency (RF) components, wherein the wireless communications device includes the adaptive voltage modulation circuits for reducing supply voltage droops in FIGS. 1, 3, and 4.

FIG. 6 illustrates an example of a wireless communications device 600 that can include radio frequency (RF) components, wherein the wireless communications device 600 can include the adaptive voltage modulation circuits 100, 300, and 400 illustrated in FIGS. 1, 3, and 4, respectively. In this regard, the wireless communications device 600 may be provided in an integrated circuit (IC) 602. The wireless communications device 600 may include or be provided in any of the above referenced devices, as examples. As shown in FIG. 6, the wireless communications device 600 includes a transceiver 604 and a data processor 606. The data processor 606 may include a memory (not shown) to store data and program codes. The transceiver 604 includes a transmitter 608 and a receiver 610 that support bi-directional communications. In general, the wireless communications device 600 may include any number of transmitters and/or receivers for any number of communication systems and frequency bands. All or a portion of the transceiver 604 may be implemented on one or more analog ICs, RF ICs (RFICs), mixed-signal ICs, etc.

A transmitter or a receiver may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the wireless communications device 600 in FIG. 6, the transmitter 608 and the receiver 610 are implemented with the direct-conversion architecture.

In the transmit path, the data processor 606 processes data to be transmitted and provides I and Q analog output signals to the transmitter 608. In the exemplary wireless communications device 600, the data processor 606 includes DACs 612(1), 612(2) for converting digital signals generated by the data processor 606 into the I and Q analog output signals, e.g., I and Q output currents, for further processing.

Within the transmitter 608, lowpass filters 614(1), 614(2) filter the I and Q analog output signals, respectively, to remove undesired signals caused by the prior digital-to-analog conversion. Amplifiers (AMP) 616(1), 616(2) amplify the signals from the lowpass filters 614(1), 614(2), respectively, and provide I and Q baseband signals. An upconverter 618 upconverts the I and Q baseband signals with I and Q transmit (TX) local oscillator (LO) signals through mixers 620(1), 620(2) from a TX LO signal generator 622 to provide an upconverted signal 624. A filter 626 filters the upconverted signal 624 to remove undesired signals caused by the frequency upconversion as well as noise in a receive frequency band. A power amplifier (PA) 628 amplifies the upconverted signal 624 from the filter 626 to obtain the desired output power level and provides a transmit RF signal. The transmit RF signal is routed through a duplexer or switch 630 and transmitted via an antenna 632.

In the receive path, the antenna 632 receives signals transmitted by base stations and provides a received RF signal, which is routed through the duplexer or switch 630 and provided to a low noise amplifier (LNA) 634. The duplexer or switch 630 is designed to operate with a specific receive (RX)-to-TX duplexer frequency separation, such that RX signals are isolated from TX signals. The received RF signal is amplified by the LNA 634 and filtered by a filter 636 to obtain a desired RF input signal. Downconversion mixers 638(1), 638(2) mix the output of the filter 636 with I and Q RX LO signals (i.e., LO_I and LO_Q) from an RX LO signal generator 640 to generate I and Q baseband signals. The I and Q baseband signals are amplified by amplifiers (AMP) 642(1), 642(2) and further filtered by lowpass filters 644(1), 644(2) to obtain I and Q analog input signals, which are provided to the data processor 606. In this example, the data processor 606 includes analog-to-digital-converters (ADCs) 646(1), 646(2) for converting the I and Q analog input signals into digital signals to be further processed by the data processor 606.

In the wireless communications device 600 in FIG. 6, the TX LO signal generator 622 generates the I and Q TX LO signals used for frequency upconversion, while the RX LO signal generator 640 generates the I and Q RX LO signals used for frequency downconversion. Each LO signal is a periodic signal with a particular fundamental frequency. A TX PLL circuit 648 receives timing information from the data processor 606 and generates a control signal used to adjust the frequency and/or phase of the I and Q TX LO signals from the TX LO signal generator 622. Similarly, an RX PLL circuit 650 receives timing information from the data processor 606 and generates a control signal used to adjust the frequency and/or phase of the I and Q RX LO signals from the RX LO signal generator 640.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An adaptive voltage modulation circuit, comprising:
   a supply voltage droop detection and mitigation circuit comprising:
     a detection circuit configured to generate a droop detection signal in an active state in response to a supply voltage provided to a load circuit being less than a droop threshold voltage; and
     a clock adjustment circuit configured to adjust a load clock signal provided to the load circuit in response to the droop detection signal;
   a supply voltage adjust circuit comprising:
     a counter circuit configured to increment a count in response to each cycle of a reference clock signal in which the droop detection signal is in an active state;
     a voltage adjust-up circuit configured to generate a voltage adjust-up signal in an active state in response to the count being greater than an adjust-up threshold value; and
     a voltage adjust-down circuit configured to generate a voltage adjust-down signal in an active state in response to the count being less than an adjust-down threshold value at an end of a defined period as measured by the reference clock signal; and a supply voltage controller circuit configured to:
increase the supply voltage provided to the load circuit in response to the voltage adjust-up signal being in an active state; and
decrease the supply voltage provided to the load circuit in response to the voltage adjust-down signal being in an active state.

2. The adaptive voltage modulation circuit of claim 1, wherein:
the voltage adjust-up circuit is further configured to generate the voltage adjust-up signal in an inactive state in response to the count being less than the adjust-up threshold value at the end of the defined period; and
the voltage adjust-down circuit is further configured to generate the voltage adjust-down signal in an inactive state in response to the count being greater than the adjust-down threshold value at the end of the defined period.

3. The adaptive voltage modulation circuit of claim 1, wherein:
the voltage adjust-up circuit is further configured to generate the voltage adjust-up signal in an inactive state in response to an acknowledgement signal of the supply voltage controller circuit indicating that the supply voltage has been adjusted up; and
the voltage adjust-down circuit is further configured to generate the voltage adjust-down signal in an inactive state in response to an acknowledgement signal of the supply voltage controller circuit indicating that the supply voltage has been adjusted down.

4. The adaptive voltage modulation circuit of claim 3, wherein the counter circuit is configured to reset the count to an initial count value in response to the acknowledgement signal of the supply voltage controller circuit indicating that the supply voltage has been adjusted up.

5. The adaptive voltage modulation circuit of claim 3, wherein the counter circuit is configured to reset the count to an initial count value in response to the acknowledgement signal of the supply voltage controller circuit indicating that the supply voltage has been adjusted down.

6. The adaptive voltage modulation circuit of claim 1, wherein the counter circuit is configured to reset the count to an initial count value in response to the end of the defined period.

7. The adaptive voltage modulation circuit of claim 1, wherein the counter circuit is further configured to:
increment an adjust-up count in response to each cycle of the reference clock signal during an adjust-up period in which the droop detection signal is in an active state; and
increment an adjust-down count in response to each cycle of the reference clock signal during an adjust-down period in which the droop detection signal is in an active state.

8. The adaptive voltage modulation circuit of claim 7, wherein the counter circuit comprises:
a first input node;
a second input node;
a first output node; and
a second output node;
the counter circuit configured to:
receive the droop detection signal on the first input node of the counter circuit;
receive the reference clock signal on the second input node of the counter circuit;
provide an up count signal indicating the adjust-up count on the first output node of the counter circuit; and
provide a down count signal indicating the adjust-down count on the second output node of the counter circuit.

9. The adaptive voltage modulation circuit of claim 8, wherein the supply voltage adjust circuit further comprises:
an adjust-up register comprising an output node and configured to:
store the adjust-up threshold value; and
provide the adjust-up threshold value on the output node of the adjust-up register; and
an adjust-down register comprising an output node and configured to:
store the adjust-down threshold value; and
provide the adjust-down threshold value on the output node of the adjust-down register.

10. The adaptive voltage modulation circuit of claim 9, wherein:
the voltage adjust-up circuit comprises:
a first input node electrically coupled to the first output node of the counter circuit;
a second input node electrically coupled to the output node of the adjust-up register; and
an output node electrically coupled to a first input node of the supply voltage controller circuit;
the voltage adjust-up circuit configured to provide the voltage adjust-up signal on the output node of the voltage adjust-up circuit; and
the voltage adjust-down circuit comprises:
a first input node electrically coupled to the second output node of the counter circuit;
a second input node electrically coupled to the output node of the adjust-down register; and
an output node electrically coupled to a second input node of the supply voltage controller circuit;
the voltage adjust-down circuit configured to provide the voltage adjust-down signal on the output node of the voltage adjust-down circuit.

11. The adaptive voltage modulation circuit of claim 1, wherein the supply voltage droop detection and mitigation circuit further comprises a droop threshold register comprising an output node and configured to:
store a digital threshold signal that is a digital representation of the droop threshold voltage; and
provide the digital threshold signal on the output node of the droop threshold register.

12. The adaptive voltage modulation circuit of claim 11, wherein the supply voltage droop detection and mitigation circuit further comprises:
a digital-to-analog converter (DAC) comprising:
an input node electrically coupled to the output node of the droop threshold register; and
an output node;
the DAC configured to provide the droop threshold voltage on the output node of the DAC; and
wherein the detection circuit comprises a comparator circuit comprising:
a first input node electrically coupled to the output node of the DAC;
a second input node electrically coupled to the supply voltage; and
an output node;
the comparator circuit configured to provide the droop detection signal on the output node of the comparator circuit, wherein:

the droop detection signal transitions to an active state in response to the droop threshold voltage being greater than the supply voltage; and the droop detection signal transitions to an inactive state in response to the droop threshold voltage being less than the supply voltage.

13. The adaptive voltage modulation circuit of claim 12, wherein the clock adjustment circuit comprises:
a first input node that receives a root clock signal;
a second input node electrically coupled to the output node of the comparator circuit; and
an output node;
the clock adjustment circuit configured to provide the load clock signal on the output node of the clock adjustment circuit, wherein the load clock signal is based on the root clock signal.

14. The adaptive voltage modulation circuit of claim 13, wherein the clock adjustment circuit is configured to adjust the load clock signal by being configured to:
decrease a frequency of the load clock signal in response to the droop detection signal transitioning to an active state such that the frequency of the load clock signal is lower than a frequency of the root clock signal; and
increase the frequency of the load clock signal in response to the droop detection signal transitioning to an inactive state such that the frequency of the load clock signal is equal or substantially equal to the frequency of the root clock signal.

15. The adaptive voltage modulation circuit of claim 1, wherein the detection circuit comprises a critical path voltage monitoring circuit powered by the supply voltage and comprising:
a first path, comprising:
a first flip flop circuit configured to be clocked by a root clock signal, comprising:
an input node; and
an output node;
a buffer, comprising:
an input node electrically coupled to the output node of the first flip flop circuit; and
an output node;
an inverter, comprising:
an input node electrically coupled to the output node of the buffer; and
an output node;
an AND-based gate, comprising:
a first input node electrically coupled to the output node of the inverter;
a second input node configured to receive an enable signal; and
an output node electrically coupled to the output node of the first flip flop circuit;
a second path, comprising:
a second flip flop circuit configured to be clocked by the root clock signal, comprising:
an input node electrically coupled to the output node of the AND-based gate; and
an output node; and
a plurality of serially connected buffers, wherein:
a first buffer of the plurality of serially connected buffers comprises an input node electrically coupled to the output node of the second flip flop circuit; and
a last buffer of the plurality of serially connected buffers comprises an output node;

an XOR-based gate, comprising:
a first input node electrically coupled to the output node of the buffer of the first path;
a second input node electrically coupled to the output node of the last buffer of the plurality of serially connected buffers of the second path; and
an output node on which the XOR-based gate is configured to provide an output signal; and
a flip flop circuit configured to be clocked by the root clock signal, comprising:
an input node electrically coupled to the output node of the XOR-based gate; and
an output node on which the flip flop circuit is configured to provide the droop detection signal.

16. The adaptive voltage modulation circuit of claim 1 integrated into an integrated circuit (IC).

17. The adaptive voltage modulation circuit of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

18. An adaptive voltage modulation circuit, comprising:
a means for generating a droop detection signal in an active state in response to a supply voltage being less than a droop threshold voltage;
a means for adjusting a load clock signal provided to a load circuit in response to the droop detection signal;
a means for incrementing a count in response to each cycle of a reference clock signal in which the droop detection signal is in an active state;
a means for generating a voltage adjust-up signal in an active state in response to the count being greater than an adjust-up threshold value;
a means for generating a voltage adjust-down signal in an active state in response to the count being less than an adjust-down threshold value at an end of a defined period as measured by the reference clock signal;
a means for increasing the supply voltage provided to the load circuit in response to the voltage adjust-up signal being in an active state; and
a means for decreasing the supply voltage provided to the load circuit in response to the voltage adjust-down signal being in an active state.

19. The adaptive voltage modulation circuit of claim 18, further comprising:
a means for generating the voltage adjust-up signal in an inactive state in response to the count being less than the adjust-up threshold value at the end of the defined period; and
a means for generating the voltage adjust-down signal in an inactive state in response to the count being greater than the adjust-down threshold value at the end of the defined period.

20. The adaptive voltage modulation circuit of claim 18, further comprising a means for resetting the count to an initial count value in response to the end of the defined period.

21. The adaptive voltage modulation circuit of claim 18, further comprising a means for generating the droop threshold voltage based on a digital threshold signal, wherein the digital threshold signal is a digital representation of the droop threshold voltage stored in a register in the adaptive voltage modulation circuit.

22. The adaptive voltage modulation circuit of claim 18, further comprising:
a means for performing a comparison of the supply voltage to the droop threshold voltage; and
a means for generating the droop detection signal in an inactive state in response to the droop threshold voltage being less than the supply voltage.

23. The adaptive voltage modulation circuit of claim 22, wherein the means for adjusting the load clock signal comprises:
a means for decreasing a frequency of the load clock signal in response to the droop detection signal transitioning to an active state such that the frequency of the load clock signal is lower than a frequency of a root clock signal; and
a means for increasing the frequency of the load clock signal in response to the droop detection signal transitioning to an inactive state such that the frequency of the load clock signal is equal or substantially equal to the frequency of the root clock signal.

24. A method for adaptively modulating a supply voltage, comprising:
generating a droop detection signal in an active state in response to a supply voltage being less than a droop threshold voltage;
adjusting a load clock signal provided to a load circuit in response to the droop detection signal;
incrementing a count in response to each cycle of a reference clock signal in which the droop detection signal is in an active state;
generating a voltage adjust-up signal in an active state in response to the count being greater than an adjust-up threshold value;
generating a voltage adjust-down signal in an active state in response to the count being less than an adjust-down threshold value at an end of a defined period as measured by the reference clock signal;
increasing the supply voltage provided to the load circuit in response to the voltage adjust-up signal being in an active state; and
decreasing the supply voltage provided to the load circuit in response to the voltage adjust-down signal being in an active state.

25. The method of claim 24, further comprising:
generating the voltage adjust-up signal in an inactive state in response to the count being less than the adjust-up threshold value at the end of the defined period; and
generating the voltage adjust-down signal in an inactive state in response to the count being greater than the adjust-down threshold value at the end of the defined period.

26. The method of claim 24, further comprising resetting the count to an initial count value in response to the end of the defined period.

27. The method of claim 24, further comprising generating the droop threshold voltage based on a digital threshold signal, wherein the digital threshold signal is a digital representation of the droop threshold voltage.

28. The method of claim 24, wherein generating the droop detection signal comprises:
performing a comparison of the supply voltage to the droop threshold voltage; and
generating the droop detection signal in an inactive state in response to the droop threshold voltage being less than the supply voltage.

29. The method of claim 28, wherein adjusting the load clock signal comprises:
decreasing a frequency of the load clock signal in response to the droop detection signal being in an active state such that the frequency of the load clock signal is lower than a frequency of a root clock signal; and
increasing the frequency of the load clock signal in response to the droop detection signal being in an inactive state such that the frequency of the load clock signal is equal or substantially equal to the frequency of the root clock signal.

30. A processor-based system, comprising:
a processor;
a power management circuit configured to provide a supply voltage to the processor; and
an adaptive voltage modulation circuit comprising:
a supply voltage droop detection and mitigation circuit comprising:
a detection circuit configured to generate a droop detection signal in an active state in response to the supply voltage being less than a droop threshold voltage; and
a clock adjustment circuit configured to adjust a load clock signal provided to the processor in response to the droop detection signal;
a supply voltage adjust circuit comprising:
a counter circuit configured to increment a count in response to each cycle of a reference clock signal in which the droop detection signal is in an active state;
a voltage adjust-up circuit configured to generate a voltage adjust-up signal in an active state in response to the count being greater than an adjust-up threshold value; and
a voltage adjust-down circuit configured to generate a voltage adjust-down signal in an active state in response to the count being less than an adjust-down threshold value at an end of a defined period as measured by the reference clock signal; and
a supply voltage controller circuit configured to:
increase the supply voltage provided to the processor in response to the voltage adjust-up signal being in an active state; and
decrease the supply voltage provided to the processor in response to the voltage adjust-down signal being in an active state.

* * * * *